Aug. 30, 1966  F. J. LUKETA  3,269,048
TRAWL DOOR AND BRIDLE APPARATUS FOR SAME
Original Filed June 27, 1963  5 Sheets-Sheet 1
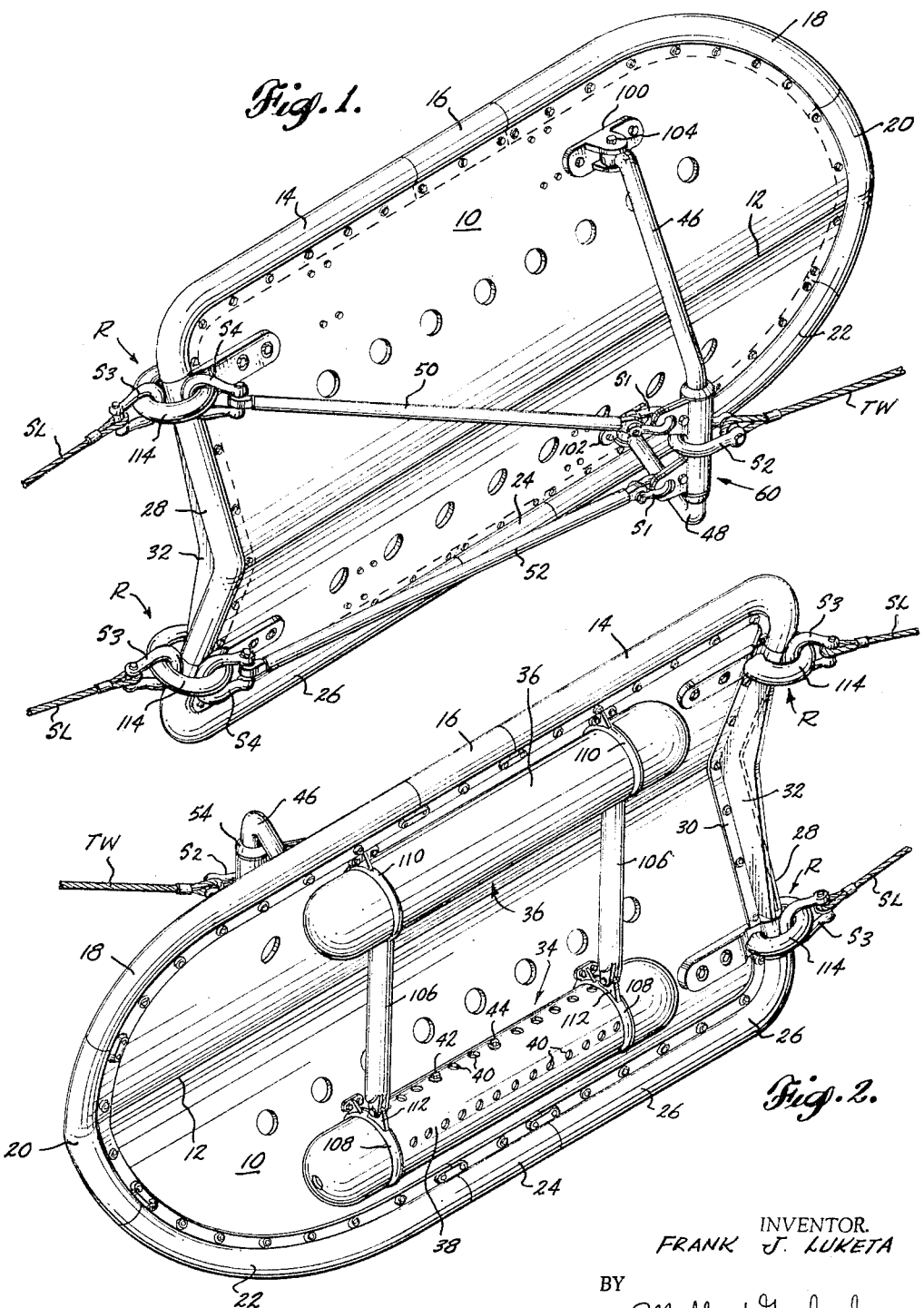
INVENTOR.
FRANK J. LUKETA
BY Mathis & Grayheal
ATTORNEYS

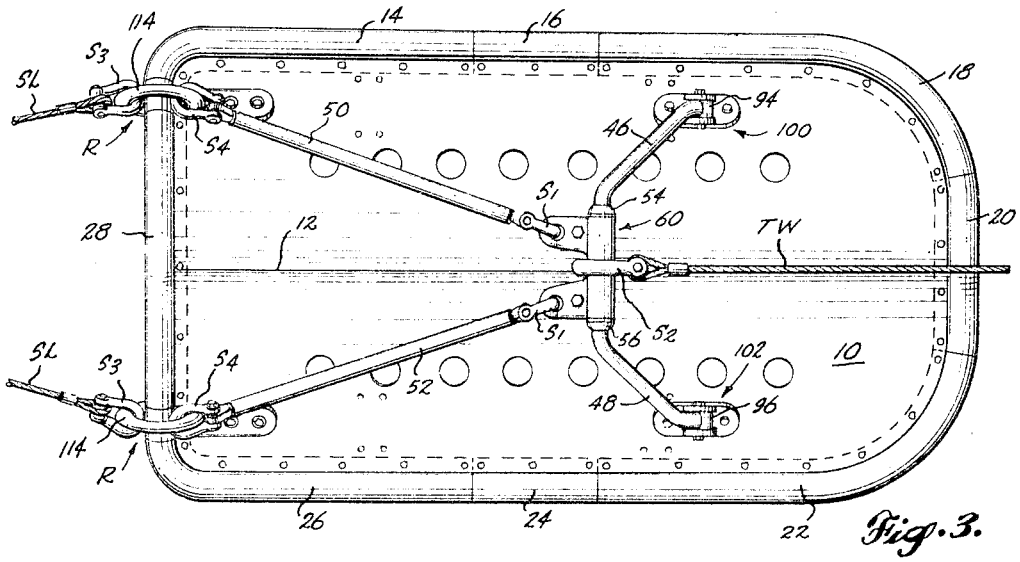
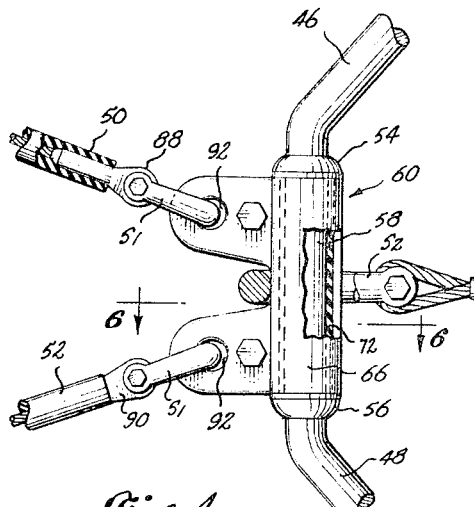
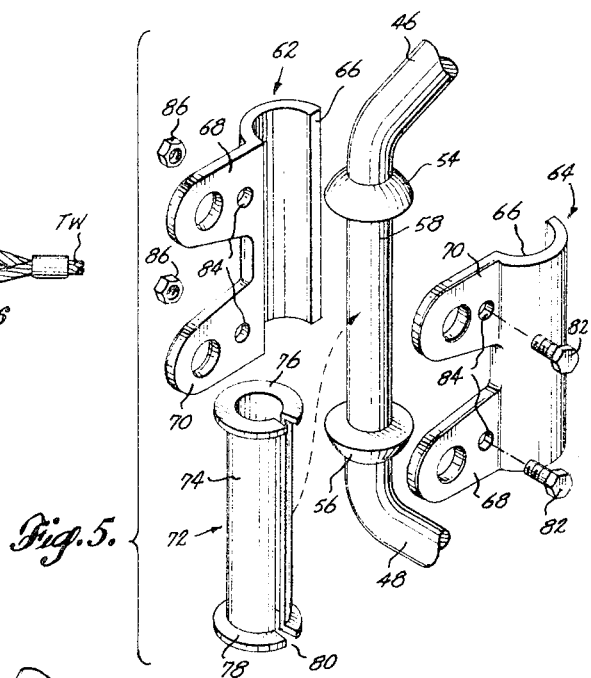
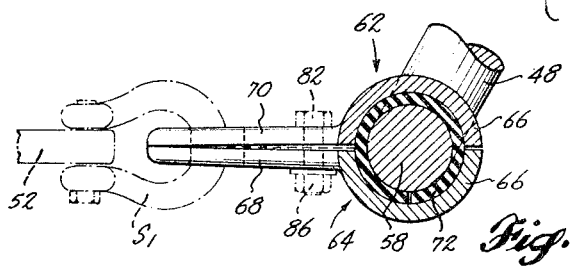

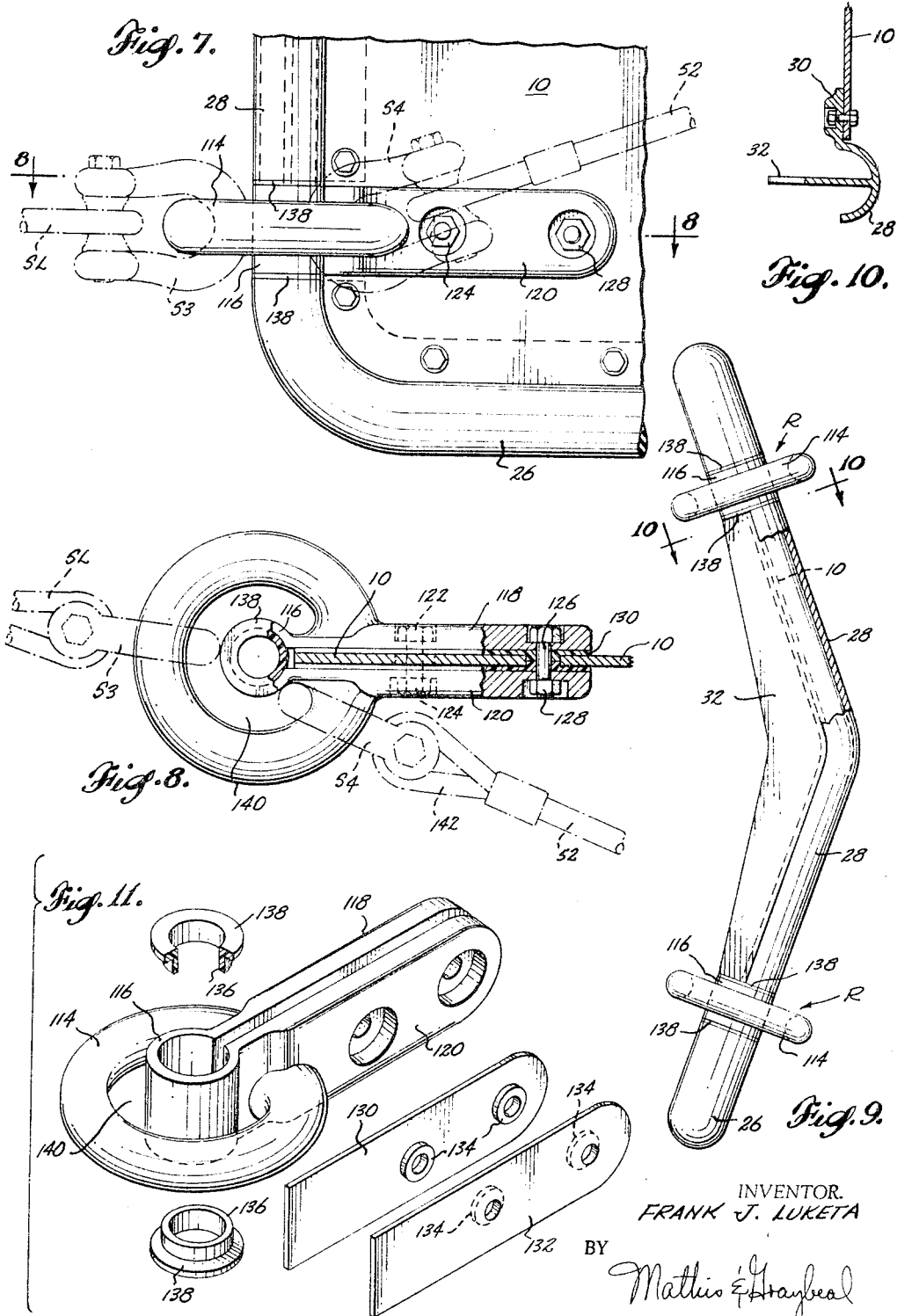

Aug. 30, 1966 F. J. LUKETA 3,269,048
TRAWL DOOR AND BRIDLE APPARATUS FOR SAME
Original Filed June 27, 1963 5 Sheets-Sheet 4

INVENTOR.
FRANK J. LUKETA
BY Mathis & Graybeal
ATTORNEYS

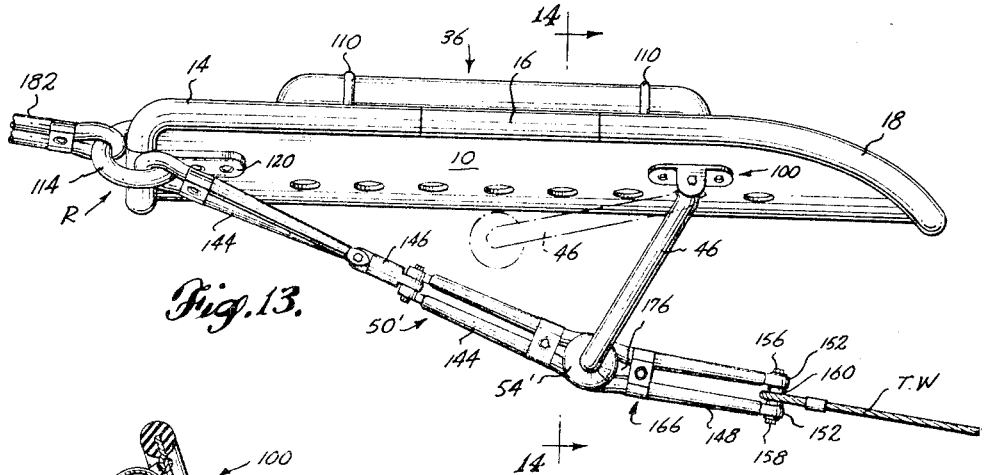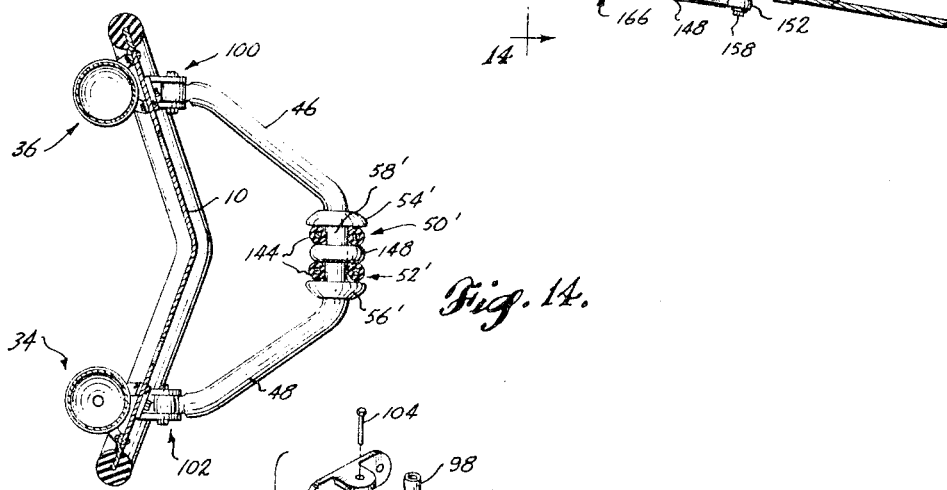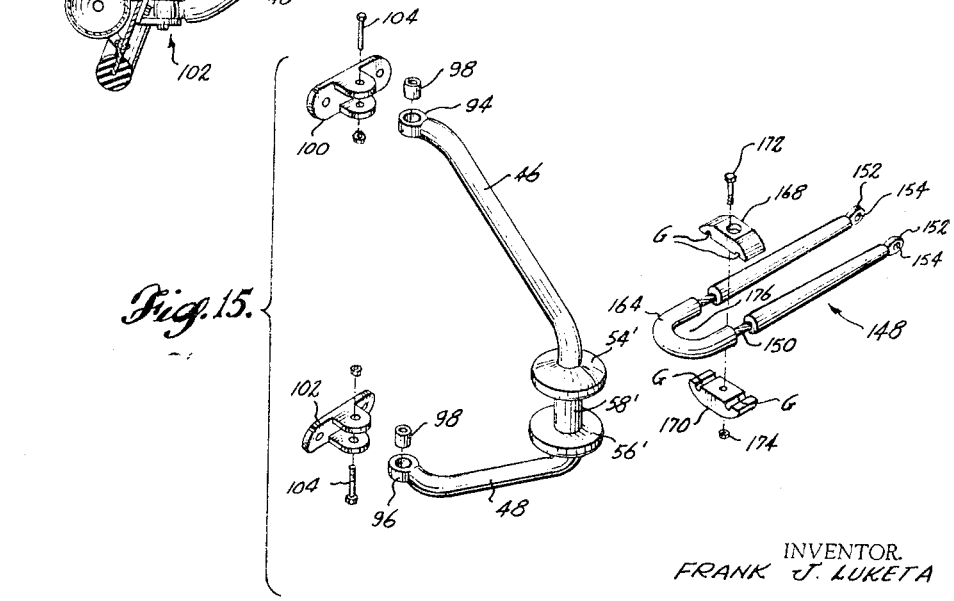

3,269,048
TRAWL DOOR AND BRIDLE APPARATUS
FOR SAME
Frank J. Luketa, 5567 Greenwood Ave. N.,
Seattle, Wash.
Continuation of application Ser. No. 291,203, June 27,
1963. This application Apr. 23, 1965, Ser. No. 453,870
6 Claims. (Cl. 43—9)

This application is a continuation of my copending, now abandoned application Serial No. 291,203, filed June 27, 1963, and entitled, Trawl Door Including Composite Bridle Apparatus.

The present invention relates to trawling, and more particularly to trawl doors, composite bridles for trawl doors, components of such bridles, and a manner of interconnecting a towing warp leading from a trawler with a trawl door and sweep lines leading to a trawl net so that a substantial part of the weight of the net and its catch is essentially directly transferred from the sweep lines to the towing warps without first passing through and stressing the trawl doors.

In known trawling installations, the trawl doors constitute a structural link between the sweep lines leading forwardly from the trawl net and the towing warps leading rearwardly from the trawler. The towing warps are connected to the leading or anterior faces of the doors by means of bridles and the sweep lines are attached to the trailing or posterior faces of such doors. The weight of the net and its catch is first transferred by the sweep lines to the doors, through the door panels, and then from the doors through the bridles to the towing warps. By virtue of this arrangement, the trawl doors are either quite heavily constructed or heavily reinforced so as to enable them to withstand the relatively high order stresses to which they are subjected. Specific examples of such prior installations are disclosed in my prior U.S. Patents Nos. 2,816,385, and 3,048,936.

It is a principal object of the present invention to provide a trawl door arrangement wherein the trawl door includes line securement means located substantially at its rear edge and both the sweep line means and the rear legs of the bridle leading from the towing warp are connected to said line securement means, such arrangement essentially providing a direct transfer of substantially all of the weight of the net and catch directly from the sweep line means through the rear legs of the bridle to the towing warp, with the trawl doors being substantially bypassed by the stresses representing the weight of the net and its catch, enabling the trawl doors to be of structurally lighter construction.

Further objects, features and advantages of the present invention include provision of a trawl door and bridle assembly wherein:

(a) In accordance with one form of the invention the line securement means located substantially at the rear edge of each trawl door comprises at least one ring member having a preferably cylindrical inner element interposed between adjacent portions of marginal edging extending around said door, a line securing element, preferably of annular construction, encircling said inner element, and a pair of tines extending inboard of the door from the said inner member and said line securement element, with the tines being disposed on opposite sides of the door panel, with openings extending through said tines and through the door panel, and with fastening means extending through said openings and securing the said ring members to the door panel;

(b) In accordance with one form of trawl door according to the present invention the door comprises a sheet metal panel (preferably aluminum), line securement means, as previously described, are affixed to the door panel adjacent the rear edge of the door, both the sweep line means and bridle legs (rear legs) leading from the towing warp are connected to such line securing elements, and the door includes a single rib or structural brace extending transversely of the door on the posterior side thereof substantially at the rear edge of the door panel;

(c) The bridle assembly includes a rigid, substantially U-shaped element including two leg portions and a bight portion, with means for pivotally connecting the respective terminal ends of said leg portions to a forward portion of the door panel, and with means at said bight portion for receiving a connector used for connecting the bridle assembly to a towing warp;

(d) According to one form of the invention the said substantially U-shaped bridle element includes a generally straight section at its bight, a line connector means comprising a pair of related half sections substantially surrounds said straight portion of the bight, with each half section including rearwardly directed ear means related to corresponding ear means on the other half section and aperture means extending through said ear means for receiving fastening means for securing the two half sections together and in that manner clamping them around said straight portion at the bight, and with said bridle assembly further including flexible rear leg members connected at their forward ends to said ear means;

(e) According to another form of bridle assembly of the present invention the generally U-shaped bridle element includes a spool-shaped section at its bight and the rear leg members of such bridle assembly each comprise a pair of flexible shackles linked together, with the bight end of one of said shackles forming the forward end of the flexible bridle leg of which it is a part, with the respective forward ends of the two flexible leg members engaging the core of the spool-like section at the bight of said generally wishbone shaped bridle element, and with another flexible shackle or like connector element engaging the core of said spool-like section and serving to connect the bridle assembly to a towing warp;

(f) The flexible shackles consist of a length of cable with its respective ends brought together so as to form a pair of legs and a bight portion therebetween, eye elements connected to the terminal ends of said cable, clamp means interconnecting between said legs closely adjacent the bight, and a resilient covering or jacket surrounding the bight portion of said cable and the leg portions of said cable between the clamping element and the eye members; and (g) Various ones of the door and bridle components, including the ring shaped line securement member by way of example, are constructed of a metal (preferably a metal consisting for the most part of iron) different than the metal of which an adjacent door or bridle component is constructed (e.g., the door panel is preferably constructed of sheet aluminum), and electric insulators are interposed between the adjacent dissimilar metals preventing their direct contact and thereby preventing galvanic corrosion.

These and other objects, features, advantages and characteristics of the present invention will be apparent from the following description of typical and therefore non-limitative embodiments thereof, wherein like letters and numerals refer to like parts, and wherein:

FIG. 1 is an isometric view of a port side trawl door, taken from the leading or anterior side thereof, the view serving to illustrate one form of composite bridle and its manner of interconnection with the trawl door and also with the towing warp;

FIG. 2 is an isometric view of the port door shown in

3

Figure 12:
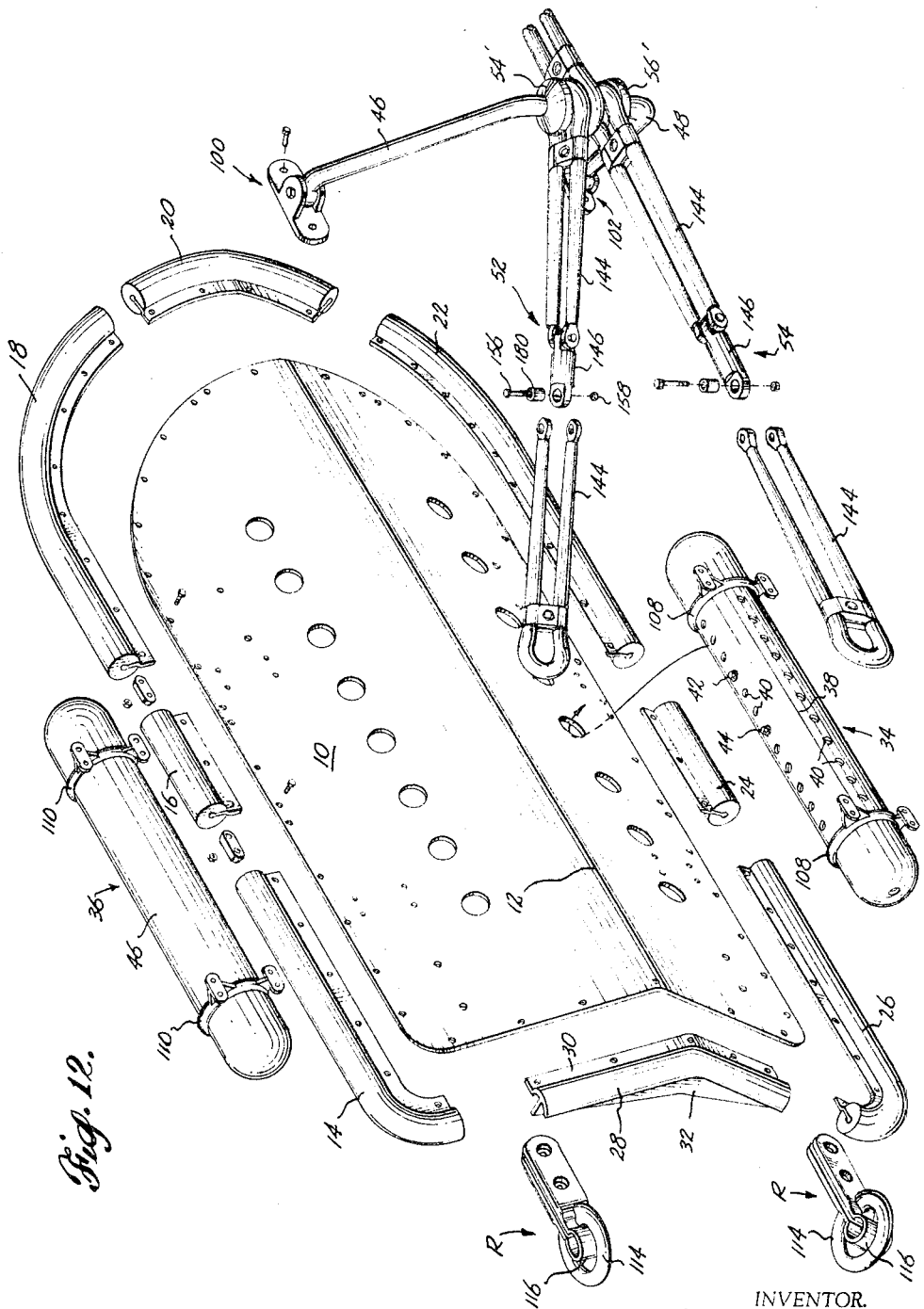

FIG. 1, as viewed from the trailing or posterior side thereof, such view presenting a clear showing of the rib or strut extending transversely of the door at the rear edge thereof;

FIG. 3 is a side elevational view of the door of FIGS. 1 and 2 taken from the leading side of such door and presenting a clear showing of the door bridle;

FIG. 4 is an enlarged scale fragmentary view of a portion of the bridle shown in FIG. 3, such view presenting the region wherein the towing warp is connected to the bridle;

FIG. 5 is an exploded isometric view of that portion of the bridle shown in FIG. 4, with the flexible rear legs of the bridle, the towing warp and the shackle connectors being omitted;

FIG. 6 is a sectional view taken substantially along line 6—6 of FIG. 4;

FIG. 7 is a fragmentary elevational view presenting the lower trailing corner of the door (as viewed from the leading side of the door) and illustrating one of the ring members, its orientation to the rear edge of the door and its manner of attachment to the door panel, such view also showing in phantom lines a sweep line and a rear leg of the bridle connected to the enlarged ring portion of said ring member;

FIG. 8 is a view taken substantially along line 8—8 of FIG. 7;

FIG. 9 is a view looking toward the rear edge of the door, with a portion of the rear edge broken away for clarity of illustration;

FIG. 10 is a view taken substantially along line 10—10 of FIG. 9;

FIG. 11 is an isometric view of one of the metallic ring members and the insulating elements that are interposed between certain portions of such ring member and adjacent portions of the door which involve a dissimilar metal;

FIG. 12 is an exploded isometric view of essentially the same door as shown in FIGS. 1–11 but in combination with a modified form of composite bridle constructed in accordance with the present invention;

FIG. 13 is a top plan view of the trawl door and bridle arrangement shown in FIG. 12, such view showing by solid lines the inuse portion of the generally U-shaped element of the bridle and showing by broken line the position which such generally U-shaped element occupies when the door is secured to a stanchion;

FIG. 14 is a view taken substantially along line 14—14 of FIG. 13, such view presenting the U-shaped element of the bridle in elevation with the forward end portions of the rear leg members of the bridle being presented in section where they engage the spool-like section at the bight of the generally U-shaped bridle element; and FIG. 15 is an exploded isometric view of the generally U-shaped bridle element, typical means employed for pivotally mounting the ends of such element onto the door panel, and the flexible shackle used to connect the bridle to the towing warp.

Referring now to the figures of the drawings in more detail, as shown in FIGS. 1–3, for example, the trawl door of the present invention comprises a metal panel 10, which in lateral cross section is of a dihedral or shallow V configuration with symmetrical panel portions above and below an apex line or crown 12. The upper and lower portions of the panel 10 are swept back substantially on the leading face of the door and have an angle between them of about 140° on the trailing face of the door. Panel 10 is preferably of aluminum construction and is preferably fabricated from sheet stock. The forward portion or nose of the door is preferably of a rounded configuration and the trailing edge thereof is preferably squared off, with slightly rounded corners.

A rounded, marginal edging bead of cushioning, abrasive resistant, lightweight material such as cured rubber extends around the nose and sides of the panel, as shown at 14, 16, 18, 20, 22, 24, and 26. Reference is made to such application for a more specific description of the marginal edging arrangement.

In addition to the edge portions indicated, the door marginal edge further comprises a rear edge section 28 which preferably comprises a rounded, generally semi-cylindrical piece of metal, such as aluminum, for example, and is preferably formed integral with a mounting flange 30 and a stiffening web, rib or brace 32 extending transversely of the door at the rear edge thereof and constituting the only major structural reinforcing element involved in this door form.

As best shown in FIG. 2, a view taken from the trailing or posterior side of the door, a ballasting means, generally indicated at 34, is attached to the trailing side of the door panel 10 adjacent the lower edge thereof. Also, a hollow buoyancy means, generally indicated at 36, is attached to the door panel 10 adjacent the upper edge thereof, at a laterally opposed location from the ballasting means 34. Each of the means 34, 36 is externally configured like the other and quickly attachable and removable from the trailing side of the door inboard of the edges thereof. Considered generally, the ballast means 34 comprises a generally cylindrical, rounded end canister 38, bolted fore and aft to the trailing face of the door panel 10 (the bolting arrangement involving external lugs on the canister through which the bolts that are used pass, suitable holes to receive the bolts being provided at appropriate points through the panel 10). Canister 38 contains a movable weight (not shown) longitudinally shiftable in position within the cylindrical portion of such canister 38. A plurality of flooding openings, some of which are indicated at 40, extend radially into the canister 38 and a selected opposed pair of such holes 40 also serve to receive a pair of positioning bolts 42, 44, which secure the movable ballast weight in a desired position within the canister.

The buoyancy means 36 comprises a sealed canister 46 of generally cylindrical rounded end configuration, provided with fore and aft lugs which are attached by bolts to the panel 10.

According to one form of the present invention the bridle assembly is characterized by a pair of forwardly directed rigid legs 46, 48 and a pair of flexible rearward legs 50, 52. As best illustrated in FIGS. 1 and 5, the forward legs 46, 48 are formed together as a single piece, which will hereinafter be referred to as the generally U-shaped portion of the bridle. A pair of laterally spaced rims 54, 56 are situated at the bight portion of the generally U-shaped element to form with a straight section 58 at the bight a generally spool-shaped section to which is secured a means 50 functioning to interconnect the respective forward ends of bridle legs 50, 52 with the towing warp TW.

As clearly illustrated in FIGS. 3–5, the connector element 60 comprises a pair of identically formed half sections 62, 64, each comprising a generally semi-cylindrical clamping portion 66 and a pair of laterally spaced ears 68, 70 extending outwardly from the same side of said cylindrical portion 66. The generally U-shaped bridle element is preferably constructed of aluminum and the two half sections 62, 64 are preferably constructed of a metal consisting for the most part of iron. An insulating element 72 is interposed between the half section 62, 64 and the elements 54, 56, 58 of the spool-like portion of said generally U-shaped bridle element to prevent direct contact of the dissimilar metals and in turn prevent galvanic corrosion. Insulator 72 may be constructed of nylon, rubber, or the like and may be constructed in the form of an elongated cylinder 74 having an inside diameter sized to snugly accommodate the straight section 58 of the spool and an outside diameter sized to be snugly accommodated within the generally semi-cylindrical portions 66 of the half section 62, 64. Flanges 76, 78 are provided at the ends of the generally cylindrical section 74 and the entire insulating element 72 including the end flanges 76, 78 is split longitudinally at 80. The nylon, rubber, or like material of which insulating element 72 is constructed is sufficiently flexible and resilient to allow such element to be spread at the split 80 during its installation onto or removal from the straight section 58 at the bight of the generally U-shaped bridle element. With insulating element 72 in place, the half sections 64, 64 are installed with their semi-cylindrical portions 66 in surrounding relation to insulator portion 74 between the flanges 76, 78 and with the ear 68 of each half section 62, 64 matching with the ear 70 of the other half section. Appropriate fastening means suitably in the form of bolts 82 are inserted through aligned openings 84 in the ears 68, 70 and are employed for securing such half sections together and onto the generally U-shaped bridle element, with of course the nuts 86 being used with the bolts 82.

Referring now to FIG. 4 in particular, the respective forward ends 88, 90 of the flexible bridle leg members 50, 52 are apertured and are connected by shackles S1, which may be conventional per se, to shackle eyes 92 formed by aligned openings extending through each matched pair of the ears 68, 70. In this form of the invention the flexible shackle legs 50, 52 may suitably take the form of sections of cable of an appropriate length to which the apertured end pieces (elements 88, 90, for example) are suitably attached and which is covered by a cylindrical sleeve of rubber or like material having wear-resistant qualities.

The bridle assembly may suitably be attached to the towing warp TW by means of a shackle S2 extending in surrounding relationship to the matched semi-cylindrical portions 66 of the half section 62, 64 between the sets of matched pairs of ears 68, 70.

The respective terminal ends 94, 96 of the rigid legs 46, 48 are preferably ring-shaped and have generally flat side surfaces and an aperture passing therethrough sized to receive a small cylindrical spacer 98 (FIG. 15). A pair of laterally spaced yokes 100, 102, respectively, are fastened to the anterior side of the door panel 10, as by bolts or the like extending through openings in generally flat base portions of such yokes and through the door panel 10. The said apertured terminal ends 94, 96 extend into jaws formed between upstanding ear portions of the yokes 100, 102 and a pin 104 extends through aligned apertures extending through the upstanding ear portions of the yokes 100, 102 and through the cylindrical spacer 98, forming knuckle type swivel joints by which the generally U-shaped bridle element is pivotally mounted onto the door panel. Suitably, the pin 104 may take the form of a nut and bolt assembly as illustrated in FIG. 15, for example.

Each spacer 98 is slightly longer than the width dimension of the end portions 94, 96 of the generally U-shaped bridle element so that when the upstanding projections of the yokes 100, 102 are drawn together by the nut and bolt assembly such ear projections will bear against the ends of the spacers 98 and not against the side surfaces of the terminal end pieces 94, 96, such arrangement assuring freedom of movement at the swivel joints.

In at least some sizes of the door the location of the yokes 100, 102 adjacent the upper and lower edges of the door panel 10 eliminates a necessity of having stiffening ribs or struts on the posterior side of the door at any location other than along the rear edge of the door. The forward legs 46, 48 exert pulling forces on the door panel 10 at the location of the yokes 100, 102, which forces oppose the resultant water pressure force tending to fold back the door panel 10 rearwardly about the apex line 12 as the door is towed through the water.

Distortion or buckling of the door panel 10 does not occur in the vicinity of yokes 100, 102 because of the close placement of such yokes 100, 102 adjacent the marginal edges of the door panel 10 where there exists a substantial amount of rim strength due partially to the rib extending around the door panel 10 and constituting a pair of the offset mounting flange of the marginal edging and due partially to the double thickness of metal at the edge of the door where the said mounting flange portion of the marginal edging overlaps the peripheral edge of the door panel 10.

In connection with doors wherein the door panel 10 is relatively large or is constructed from extremely thin material, it may be desirable or even necessary to provide the door with auxiliary transverse bracing elements. A typical and therefore non-limitive arrangement along this line is illustrated in FIG. 2, wherein a pair of what may be termed inside struts 106 extend between and connect at their respective ends to portions of the mounting means for the ballasting and buoyancy canisters 38, 46, respectively. The mounting means for the canisters 38, 46 include rings 108, 110 extending generally circumferentially about said canisters 38, 46. The mounting pads or flanges for securing the canisters 38, 46 onto the door panel 10 extend outwardly from the said rings 108, 110 at appropriate location thereon, and mounting ears 112 to which the stiffeners 106 are attached extend outwardly from said rings 108, 110 at locations circumferentially spaced from said mounting pads or flanges. The stiffeners 106 may comprise a tubular or channel (i.e., U-shaped in cross-section) shaped body portion and may be suitably attached to the said mounting ears 112 by means of nut and bolt assemblies or the like.

As shown in FIGS. 1–3, for example, a pair of line securement eye means, hereinafter referred to as ring members R, are situated at laterally spaced locations at the rear edge of the door. FIGS. 7, 8, 9 and 11 relate specifically to the constructional details of the ring members R, with FIG. 11 presenting an isometric view of a ring member R disconnected from the door panel 10. Ring member R is characterized by an enlarged line securement ring or bar portion 114, preferably in the form of an annulus, at its outboard end in coaxially surrounding relationship to a generally tubular inner element 116 forming a portion of the marginal edging at the rear edge of the door when said ring member R is connected to the door panel 10, as shown in FIG. 7, for example. The inboard end of ring member R comprises a pair of spaced, generally bar-like tines 118, 120, which are adapted to extend on opposite sides of the door panel 10. Preferably, at least two longitudinally spaced sets of openings extend through the tines 118, 120 and the door panel 10 for receiving nut and bolt assemblies 122, 124 and 126, 128, respectively, used to fasten the ring member R to the door panel 10. As in FIG. 8, the end portions of the nut 122, 126 are countersunk into openings that are configured to match the external configuration of said heads, such openings functioning as wrenches, gripping the side surfaces of said heads and preventing the bolts 122, 126 from turning while the nuts 124, 128 are being installed on the opposite side of the door. The nuts 124, 128 are preferably countersunk into circular openings or walls that are of sufficient size to receive the end of a wrench used for tightening the nuts 124, 128.

As previously stated, the door panel 10 is preferably constructed of aluminum, and it is preferred that section 28 of the marginal edging be constructed of aluminum and that the ring member R be constructed from a metal consisting for the most part of iron. Inserts 130, 132 of nylon or the like are interposed between the respective inner surfaces of the tines 118, 120 and the respective sides of the door panel 10 so as to prevent the direct contact of the dissimilar metals and in such manner prevent galvanic corrosion of the aluminum. The insulating inserts 130, 132 may include ring-like projections 134 at the locations of the openings through which the bolts 122, 126 extend. Such ring-shaped projections 134 are suitably shaped so that when the inserts 130, 132 and the ring member R are assembled onto the door panel 10 they essentially fill up the large openings which extend through the door panel 10 at each location of a nut and bolt assembly.

Another insulator consisting of a relatively short cylindrical section 136 and a radially extending end flange 138 is provided to prevent contact of the inner member 116 of the ring member R with the section 28 of the marginal edging. The said cylindrical portion 136 extends inside of the inner member 116 and the radially extending flange portion 138 is interposed between the end of said member 116 and the adjacent end of the edging section 28. In the drawings a second insulator of identical form is shown located between the opposite end of said member 116 and the adjacent end of section 26 of the marginal edging.

The enlarged ring 114 extends within a plane that is generally perpendicular to at least that portion of the door panel 10 to which the ring member R is attached. As most clearly shown in FIG. 8, a generally C-shaped innerspace 140 is formed between the ring 14 and the inner member 116. A sweep line SL is connected to the ring 114 by means of a shackle S3, which may be conventional per se, the bight portion of such shackle S3 being accommodated within the generally C-shaped innerspace 140. At a circumferentially spaced location the bight portion of another shackle, designated S4, is also accommodated within said innerspace 140, and such shackle S4 serves to connect the rearward end of bridle rear leg member 52 to the ring 114.

As is evident from the foregoing description, essentially all of the weight or drag of the trawl net and its catch is transferred by the sweep lines SL through the ring 114 to the rear legs 50, 52 of the bridle and from such rear legs 50, 52 of the bridle to the towing warp TW. However, since the bridle legs 50, 52 angle inwardly as they extend from the rear edge of the door to the towing warp, and since in at least some installations the sweep lines SL also angle inwardly (converge) as they extend rearwardly of the rear edge of the door, inwardly directing components of force representing a portion of the weight or drag of the net and its catch are transferred to the ring members R and from such ring members R to the door panel 10. These inwardly directed force components tend to collapse or fold back the rear end portion of the door. However, these force components are resisted and the collapse or fold back of the door is prevented by the stiffening rib or strut 32.

FIGS. 12–15 present a door involving a modified form of bridle assembly. According to this form of the invention, the rear legs of the bridle are constructed of a pair of flexible shackles or connector elements, each of which is designated 144, interconnected by means of a short link 146 in a manner to be hereinafter described. As shown in FIG. 13, for example, flexible shackles or connectors 148, 182 identical in form to the said shackles 144 interconnect, respectively, the bridle with the towing warp TW, and the ring 114 with the sweepline.

Referring to FIG. 15, shackle 148 has been selected by way of example to show the constructional arrangement in detail of each of the flexible shackles illustrated in forming a part of this invention. The shackle 148 is shown as comprising a generally U-shaped piece of flexible cable 150 covered by rubber or like material having comparable resiliency and wear resistance, and which is water-lubricated. An eye element 152 is provided at each end of cable 150 and each such eye element possesses a central opening 154. In attaching the shackle 148 to another component of the door the eye elements 152 are placed on opposite sides of such component and the openings 154 are aligned with an opening in such component and a fastener such as a bolt 156 (FIG. 13) is inserted through said aligned openings and a nut 158 secured to its threaded end.

Preferably a generally cylindrical spacer 160 is located in the jaw formed between the eye elements 152 and the bolt 156 extends through the said openings 154 and a longitudinal passageway extending through the spacer 160. Spacer 160, as its name implies, serves to space the eye elements 152 a predetermined distance apart.

In the installation illustrated in FIG. 13, for example, wherein a cable or eye of relatively small diameter such as that on the end of the towing warp TW contacts the spacer 160, such spacer 160 is circumferentially grooved at its mid-portion so as to provide a rounded surface for the eye portion of the towing warp TW to bear against, such arrangement preventing substantial distortion of the eye.

Adjacent the bight end 164 of the shackle 148 a clamp 166 interconnects between laterally spaced portions of the cable 150. Clamp 166 consists of two generally bar-shaped sections 168, 170 of identical construction and secured together by a nut and bolt assembly 172, 174, or the like. The location of clamp 166 close to the bight shortens the innerspace 176 in which the bridle component to which the shackle 148 is attached is free to move. Referring now to FIG. 15, the inboard faces of the clamp sections 168, 170 are grooved so that when said clamp sections 168, 170 are assembled together each matched pair of such grooves G substantially surround a portion of the cable 150, effectively restraining such cable portions against lateral movement.

Considering the constructional arrangement and detail of the flexible bridle legs 50', FIG. 13 clearly illustrates such bridle legs to include a pair of flexible shackles 144 interconnected at their jaw ends by a connecting link 146. The said connecting link 146 is illustrated as having a generally cylindrical mid-portion and flattened, apertured ends which during assembly are each situated between the apertured end pieces of a shackle. A spacer and wear member, substantially like previously described spacer 160 but not necessarily grooved, extends through each of the apertures provided in the links 146 and the bolt portion of the nut and bolt assembly 156, 158 extends through a central opening in such spacer.

In the form of the bridle assembly presented by FIGS. 12–15, a generally U-shaped bridle element substantially identical in construction to the previously described, similarly shaped element forming a portion of the bridle form illustrated in FIGS. 1–11 constitutes the forward legs of such bridle. Referring to FIG. 15, for example, in the present form of the invention the rims 54' and 56', spaced apart at the bight portion of said generally U-shaped bridle element are preferably of larger size than the rims 54, 56 in the previously described installation of FIGS. 1–11. In this form of the invention, the respective bight portions of the two shackles 144 which constitute the forward portions of the rear legs 50', 52', and the bight portion of the shackle 148 which connects the bridle assembly to the towing warp TW are disposed in surrounding relationship to the straight section 58' between the spaced rims 54', 56', with shackle 148 preferably being interposed between shackles 144, as illustrated in FIG. 14, for example.

From the foregoing, various further modifications, arrangements and adaptations of the present invention will occur to those skilled in the art to which the invention is addressed, within the scope of the following claims.

What is claimed is:

1. For use with a trawl door, line securement means adapted to be disposed substantially at an edge of the trawl door, said line securement means comprising:
   (a) a pair of tines, each extending in spaced relation with respect to the other;
   (b) at least one opening extending through each tine and being coaxially related to an opening in the other tine;
   (c) ring-like means connected to one of its ends to one end of one of the tines and extending along a curved path to meet and be connected to the end of the other tine that is closest to the said one end of the first tine; and (d) an inner ring member connected to adjacent ends of said tines and disposed to be encircled by said ring-like means.

2. For use with a trawl door of the type adapted to be towed in the water by a towing warp leading from a trawling vessel to said door and used for spreading a wing portion of a trawl net, a bridle assembly comprising:

(a) a generally U-shaped bridle element including leg portions and a bight portion, said element being of rigid construction and including a generally straight section at the bight and a disk-shaped element at each end of said generally straight section, said straight section and the two generally disk-shaped elements together defining a spool;

(b) a pair of flexible leg members each of which includes an end portion disposed in surrounding relationship to the straight section of said spool; and (c) a connector element including an end portion disposed in surrounding relationship to the straight section of said spool and in side-by-side relationship to the end of one of said flexible leg members.

3. The combination of claim 2, wherein each of said flexible leg members comprises a pair of flexible shackles connected together, wherein each such shackle is generally U-shaped and includes two legs and a bight end, with the ends of said legs being apertured and being situated adjacent the apertured ends of the other shackle, and wherein means comprising a link with flattened end portions interconnects between said shackles, with each said flattened end portion being apertured and being disposed between the respective apertured ends of the legs of one of said shackles, and with fastening means extending through the apertures for connecting the shackles to the said link.

4. A trawl door comprising: a water reaction panel having an anterior face, a posterior face and a rear edge; marginal edging extending along the rear edge of said panel; a pair of ring members connected to said panel at spaced apart locations adjacent the rear edge therof, each said ring member including an inner portion interposed between adjacent portions of said marginal edging, and a line securing element generally encircling said inner portion; and means for connecting said water reaction panel to a towing warp.

5. A trawl door in accordance with claim 4, wherein each ring member further includes a pair of tines extending from said inner portion and said line securement element along opposite sides of the panel, with openings extending through said tines and through the panel, and with fastening means extending through said openings and securing the said ring members to the water reaction panel.

6. A trawl door in accordance with claim 4, wherein the inner portion of each ring member and at least one of the portions of said marginal edging between which it is interposed, are made of dissimilar metals, and insulating means is located therebetween for the purpose of curtailing galvanic corrosion.

References Cited by the Examiner

UNITED STATES PATENTS

| | | | |
|---|---|---|---|
| 1,149,807 | 8/1915 | Bascom | 280—480 X |
| 1,498,827 | 6/1924 | Wiswell | 287—100 X |
| 1,599,353 | 9/1926 | Albin | 280—480 X |
| 1,842,634 | 1/1932 | Symonds | 43—9 |
| 2,443,946 | 6/1948 | Bozorth | 43—25 |
| 2,825,992 | 3/1958 | Miller | 43—25.2 |
| 2,942,371 | 6/1960 | Johnson et al. | 43—9 |

FOREIGN PATENTS

| | | |
|---|---|---|
| 5,782 | 8/1897 | Great Britain. |
| 197,981 | 5/1923 | Great Britain. |

SAMUEL KOREN, *Primary Examiner.*

W. H. CAMP, *Assistant Examiner.*